United States Patent Office 3,081,287
Patented Mar. 12, 1963

3,081,287
MONOSUBSTITUTED ALUMINUM DIHALIDE CATALYSTS FOR OLEFIN POLYMERIZATION
Harry W. Coover, Jr., and Newton H. Shearer, Jr., Kingsport, Tenn., assignors to Eastman Kodak Company, Rochester, N.Y., a corporation of New Jersey
No Drawing. Filed Mar. 31, 1958, Ser. No. 724,916
5 Claims. (Cl. 260—93.7)

This invention relates to a new and improved polymerization process and is particularly concerned with the use of a novel catalyst combination for preparing high molecular weight solid polyolefins, such as polyethylene and polypropylene, of high density and crystallinity. In a particular aspect the invention is concerned with the preparation of polyethylene and polypropylene using a particular catalyst combination which has unexpected catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combination, and the results are ordinarily highly unpredictable, since relatively minor changes in the catalyst combination often lead to liquid polymers rather than the desired solid polymers.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to form a crystalline product. When this catalyst mixture is employed to polymerize propylene the product is predominantly polymeric oils and rubbers with a comparatively small amount of high molecular weight, crystalline product. Furthermore, a mixture of ethyl aluminum dihalide and titanium trihalide is ineffective as a polymerization catalyst, for example, for polymerizing propylene.

Some of the catalysts that are effective for producing crystalline high density polyethylene cannot be used to produce a similar type of polypropylene. Thus, one cannot predict whether a specific catalyst combination will be effective to produce crystalline high density polymers with specific α-olefins.

This invention is concerned with and has for an object the provision of improved processes whereby α-monoolefins and particularly ethylene and propylene can be readily polymerized by catalytic means to give high molecular weight, highly crystalline polymers. A particular object of the invention is to provide a catalyst combination which has unexpected catalytic activity for the polymerization of α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers of excellent color by effecting the polymerization in the presence of a catalytic mixture containing an aluminum dihalide having the formula $R_1AlX_2$ wherein $R_1$ is a hydrocarbon radical containing 1 to 12 carbon atoms and selected from the group consisting of alkyl, aryl and aralkyl, and X is a halide selected from the group consisting of chlorine, bromine and iodine. a compound of a transition metal selected from the group consisting of titanium, zirconium, vanadium, chromium and molybdenum, said compound being selected from the group consisting of halides, alkoxyhalides and acetylacetonates, and a group VA compound having the formula $R_3Z$ wherein Z is selected from the group consisting of nitrogen, phosphorus, arsenic and antimony and each R is selected from the group consisting of hydrogen and hydrocarbon radicals containing 1–12 carbon atoms and selected from the group consisting of alkyl, aryl and aralkyl. Among these hydrocarbon radicals are methyl, ethyl, propyl, butyl, phenyl, phenylethyl and naphthyl. In the group VA compound the three radicals represented by R can be the same or different. The catalytic activity of this mixture was wholly unexpected, particularly since the monoalkyl aluminum dihalides either singly or in admixture with the aforementioned transition metal compounds are ineffective as polymerization catalysts. Also the third component of this catalyst composition is not an effective polymerization catalyst. The inventive process is carried out in liquid phase in an inert organic liquid and preferably an inert liquid hydrocarbon vehicle, but the process can be carried out in the absence of an inert diluent. The process proceeds with excellent results over a temperature range of from 0° C. to 250° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polyethylene, polypropylene, the polybutenes and polystyrene although it can be used for polymerizing mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higher.

The novel catalysts described above are quite useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

As has been indicated above the improved results obtained in accordance with this invention depend upon the particular catalyst combination. Thus, one of the components of the catalyst is an aluminum dihalide having the formula $R_1AlX_2$ wherein $R_1$ is a hydrocarbon radical containing 1–12 carbon atoms and selected from the group consisting of alkyl, aryl and aralkyl. Among these hydrocarbon radicals are methyl, ethyl, propyl, butyl, phenyl, phenylethyl, naphthyl, and benzyl, and X is a halogen selected from the group consisting of chlorine, bromine and iodine. The preferred aluminum dihalides are the lower alkyl aluminum dihalides and the most preferred compound is ethyl aluminum dichloride. Another component of the catalyst composition is a compound of a transition metal selected from the group consisting of titanium, zirconium, vanadium, chromium and molybdenum. In these compounds the transition metal can be at its maximum valence but it is preferred to employ a compound of a transition metal having a reduced valence. Among the transition metal compounds that can be used are the halides, alkoxyhalides and acetylacetonates of the above-named transition metals. Such compounds as titanium tetrachloride, titanium trichloride, dibutoxy titanium dichloride, diethoxy titanium dichloride and titanium acetylacetonate can be used in the catalyst combination. Similar compounds of zirconium, vanadium, chromium and molybdenum can also be used. For the most desirable results it is preferred to use a halide of titanium having a reduced valency and specifically it is preferred to employ titanium trichloride in the catalyst composition. The third component of the catalyst composition is a compound of a group VA element having the structural formula $R_3Z$ wherein Z is a group VA element selected from the group consisting of nitrogen, phosphorus, arsenic and antimony. Each R is a radical selected from the group consisting of hydrogen and hydrocarbon radicals containing 1–12 carbon atoms as defined hereinabove. Preferably R is selected from the group consisting of lower alkyl containing from 1–4 carbon atoms and phenyl. In this third component the R radicals can be the same but in some instances it is desired to employ different radicals within the definition set forth above. Among the specific compounds that can be used are tributylamine, diethylaniline, tributyl phosphine, triphenylphosphine, triphenylarsine, triphenylstibine and the like. The catalyst compositions of this invention, when reacted with water, do not produce hydrogen.

The limiting factor in the temperature of the process appears to be the decomposition temperature of the catalyst. Ordinarily temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution.

The preferred molar ratio of the aluminum dihalide to transition metal compound to group VA compound can be varied within the range of 1 to 2/0.5 to 2/0.1 to 1, but it will be understood that higher and lower molar ratios are within the scope of this invention. A particularly effective catalyst contains one mole of transition metal compound and 0.5 mole of group VA compound per mole of aluminum dihalide. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well-known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing ethylene, propylene, styrene and other α-monoolefins in accordance with this invention is a mixture of ethyl aluminum dichloride, titanium trichloride and tributylamine. The importance of the various components of this reaction mixture is evident from the fact that a mixture of ethyl aluminum dichloride and titanium trichloride is ineffective for polymerizing propylene. However, when tributylamine or other group VA compound within the scope of this invention is added to the mixture the resulting catalyst composition is highly effective for polymerizing propylene to form a highly crystalline, high-density, high-softening polymer.

The invention is illustrated by the following examples of certain preferred embodiments thereof, although it will be understood that the invention is not limited thereby unless otherwise specifically indicated.

*Example 1*

In a dry box 2 grams of catalyst was added to a 500 ml. pressure bottle containing 100 ml. of dry heptane. The catalyst was made up of ethyl aluminum dichloride and titanium trichloride in a molar ratio of 1:1. The pressure bottle was then attached to a propylene source and the reaction mixture was agitated at 90° C. and under 30 p.s.i. of propylene pressure for 6 hours. No polypropylene was formed during this time indicating that under these conditions the catalyst mixture was ineffective for polymerizing propylene.

*Example 2*

The procedure described in Example 1 was followed using 2 grams of a catalyst made up of phenyl aluminum dichloride, titanium trichloride and tributylamine in a molar ratio of 1:1:0.5. During the 6-hour period of agitation of the reaction mixture at 90° C. under 30 p.s.i. propylene pressure, there was formed 11 grams of highly crystalline polypropylene having a density of 0.917 and an inherent viscosity of 3.65.

*Example 3*

In a dry box a 280 ml. stainless steel autoclave was loaded with 50 ml. of dry heptane and 1.5 grams of a catalyst made up of ethyl aluminum dichloride, titanium trichloride and triphenyl phosphine in a molar ratio of 1:1:0.5. The autoclave was sealed and placed in a rocker. 51 grams (100 ml.) of liquid propylene was added to the catalyst mixture and the resulting mixture was heated to 100° C. and maintained at that temperature for four hours. The solid polypropylene which was formed was washed with dry methanol to remove catalyst residues and then with water prior to drying. The highly crystalline polypropylene product weighed 48 grams and had a density of 0.919 and an inherent viscosity of 3.28.

*Example 4*

The process of Example 3 was followed using a 2-gram catalyst charge containing ethyl aluminum dibromide, titanium trichloride and triphenyl stibine in a molar ratio of 1:1:0.2. A 30-gram yield of polypropylene was produced, and the polymer had a density of 0.917 and an inherent viscosity of 2.44. Similarly, desirable results are obtained by replacing triphenyl stibine with an equimolar amount of triethyl stibine.

*Example 5*

The process of Example 3 was followed using a 1-gram catalyst charge containing phenyl aluminum dichloride, titanium trichloride and triphenyl arsine in a molar ratio of 2:1:0.5 at a temperature at 125° C. The yield of highly crystalline polypropylene was 14 grams. The triphenyl arsine can be replaced by an equimolar amount of tributyl arsine.

*Example 6*

The process of Example 3 was followed using a 1-gram catalyst charge containing ethyl aluminum dischloride and dibutoxy titanium dichloride in a molar ratio of 1:1. A 10-gram yield of rubbery polypropylene was obtained and, after this rubbery polypropylene was extracted successively with ether, acetone and heptane, a 2.5 gram residue of highly crystalline polypropylene was obtained having a density of 0.919 and an inherent viscosity of 1.48.

*Example 7*

The process of Example 6 was followed using a catalyst charge containing ethyl aluminum dichloride, dibutoxy titanium dichloride and triphenyl phosphine in a molar ratio of 1:1:0.5. A 20-gram yield of highly crystalline polypropylene having a density of 0.919 and an inherent viscosity of 2.59 was obtained. This example when compared with Example 6 demonstrates the beneficial effect of the phosphine component of the catalyst mixture for improving the yield and the crystallinity of the polypropylene.

*Example 8*

The process of Example 3 was followed using a 1.5-gram catalyst charge containing benzyl aluminum dichloride, titanium trichloride and diethyl aniline in a molar ratio of 1:1:1 at a polymerization temperature of 150° C. The yield of highly crystalline polypropylene was 18 grams and the polymer had a density of 0.918 and an inherent viscosity of 1.1. Replacement of diethyl aniline with equimolar quantities of diethyl α-naphthyl amine produces equally desirable results.

Example 9

The process of Example 3 was followed using the same catalyst charge and a temperature of 25° C. for a period of 48 hours. A 20-gram yield of polypropylene was obtained and the polymer had a density of 0.918 and an inherent viscosity of 4.5.

Example 10

The process of Example 3 was followed using 0.1 gram of the same catalyst and a polymerization temperature of 125° C. A yield of 2.9 grams of highly crystalline polypropylene was obtained.

Example 11

The process of Example 3 was followed using a 2-gram catalyst charge containing ethyl aluminum diodide, vanadium trichloride and triphenyl phosphine in a molar ratio of 1:1:0.5. A total of 34 grams of highly crystalline polypropylene was produced.

Example 12

The process of Example 3 was followed using a 1-gram catalyst charge containing ethyl aluminum dichloride, titanium tetrachloride and tributyl amine in a molar ratio of 1:1:0.2 with a polymerization temperature of 70° C. A 19-gram yield of polypropylene was produced and the polymer had a density of 0.912 and an inherent viscosity of 2.87. Replacement of the tributyl amine with equimolar amounts of tri-dodecyl amine produces equally desirable results.

Example 13

The process of Example 3 was followed using a 1.5-gram catalyst charge containing ethyl aluminum dichloride, zirconium tetrachloride and triphenyl phosphine in a molar ratio of 1:1:0.5. A 17-gram yield of polypropylene was produced and the polymer had a density of 0.914. In the same manner chromium trichloride and molybdenum pentachloride were used in place of zirconium tetrachloride to produce polypropylene in yields of 9 and 7 grams respectively with respective densities of 0.912 and 0.910.

Example 14

The process of Example 3 was followed using ethylene at 400 p.s.i. pressure in place of propylene. A 34-gram yield of polyethylene having a density of 0.957 was produced.

Example 15

The process of Example 3 was followed using 50 grams of 1-butene in place of propylene. A 23-gram yield of highly crystalline poly-1-butene was produced. In the same manner highly crystalline polymers were obtained from the following olefins: 3-methyl-1-butene, 4-methyl-1-pentene, allyl benzene, styrene, vinyl cyclohexane, vinyl cyclopentane, and substituted styrenes such as fluorostyrene.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. In the polymerization of propylene to form solid crystalline polymer, the improvement which comprises effecting the polymerization in liquid dispersion in an inert organic liquid and in the presence of a catalytic mixture in a molar ratio of 1 to 2/0.5 to 2/0.1 to 1 of ethyl aluminum dichloride, titanium trichloride, and triphenyl phosphine.

2. As a composition of matter, a polymerization catalyst mixture in a molar ratio of 1 to 2/0.5 to 2/0.1 to 1 of ethyl aluminum dichloride, titanium trichloride, and triphenyl phosphine.

3. In the polymerization of α-olefinic hydrocarbon containing 3–10 carbon atoms to form solid crystalline polymer, the improvement which comprises catalyzing the polymerization with a catalytic mixture of an alkyl aluminum dichloride wherein the alkyl radical contains 1–12 carbon atoms, a titanium chloride and triphenyl phosphine, the molar ratio of alkyl aluminum dichloride to titanium chloride to triphenyl phosphine being within the range of 1 to 2/0.5 to 2/0.1 to 1.

4. In the polymerization of propylene to form solid crystalline polymer, the improvement which comprises catalyzing the polymerization with a catalytic mixture of an alkyl aluminum dichloride wherein the alkyl radical contains 1–12 carbon atoms, a titanium chloride and triphenyl phosphine, the molar ratio of alkyl aluminum dichloride to titanium chloride to triphenyl phosphine being within the range of 1 to 2/0.5 to 2/0.1 to 1.

5. As a composition of matter, a polymerization catalyst for polymerizing propylene to solid crystalline polymer containing an alkyl aluminum dichloride wherein the alkyl radical contains 1–12 carbon atoms, a titanium chloride and triphenyl phosphine, the molar ratio of alkyl aluminum dichloride to titanium chloride to triphenyl phosphine being within the range of 1 to 2/0.5 to 2/0.1 to 1.

References Cited in the file of this patent

UNITED STATES PATENTS

| | | |
|---|---|---|
| 2,832,759 | Nowlin et al. | Apr. 29, 1958 |
| 2,846,427 | Findlay | Aug. 5, 1958 |
| 2,886,561 | Reynolds et al. | May 12, 1959 |
| 2,905,645 | Anderson et al. | Sept. 22, 1959 |
| 2,910,461 | Nowlin et al. | Oct. 27, 1959 |

FOREIGN PATENTS

| | | |
|---|---|---|
| 554,242 | Belgium | May 16, 1957 |
| 789,781 | Great Britain | Jan. 29, 1958 |
| 1,163,926 | France | May 5, 1958 |